5 Sheets—Sheet 1.

C. B. WITHINGTON.

Assignor, by mesne assignments, to THE McCORMICK HARVESTING MACHINE CO.

Grain Binder.

No. 9,735. Reissued May 31, 1881.

WITNESSES

Wm. A. Skinkle,
Wm. T. Kilgore

INVENTOR

Charles B. Withington.

By his Attorneys

Adams, Hopkins & Peyton

5 Sheets—Sheet 2.

C. B. WITHINGTON.

Assignor, by mesne assignments, to THE McCORMICK HARVESTING MACHINE CO.

Grain Binder.

No. 9,735. Reissued May 31, 1881.

WITNESSES

Wm A. Skinkle.
Wm T. Kilgrove

INVENTOR

Charles. B. Withington.

By his Attorneys

Baldwin, Hopkins & Peyton

5 Sheets—Sheet 3.

C. B. WITHINGTON.

Assignor, by mesne assignments, to THE McCORMICK HARVESTING MACHINE CO.

Grain Binder.

No. 9,735. Reissued May 31, 1881.

WITNESSES

Wm. A. Skinkle.

Wm. F. Kilgrove

INVENTOR

Charles B. Withington.

By his Attorneys

Baldwin, Hopkins & Peyton

5 Sheets—Sheet 4.

C. B. WITHINGTON.

Assignor, by mesne assignments, to THE McCORMICK HARVESTING MACHINE CO.

Grain Binder.

No. 9,735. Reissued May 31, 1881.

WITNESSES

Wm. A. Skinkle.

Wm. F. Kilgore

INVENTOR

Charles B. Withington.

By his Attorneys

Baldwin, Hopkins & Peyton

C. B. WITHINGTON.

Assignor, by mesne assignments, to THE McCORMICK HARVESTING MACHINE CO.

Grain Binder.

No. 9,735. Reissued May 31, 1881.

WITNESSES

Wm. A. Skinker

Wm. F. Kilgrove

INVENTOR

Charles B. Withington.

By his Attorneys

Baldwin, Hopkins & Peyton

UNITED STATES PATENT OFFICE.

CHARLES B. WITHINGTON, OF JANESVILLE, WISCONSIN, ASSIGNOR, BY MESNE ASSIGNMENTS, TO THE McCORMICK HARVESTING MACHINE COMPANY, OF CHICAGO, ILLINOIS

GRAIN-BINDER.

SPECIFICATION forming part of Reissued Letters Patent No. 9,735, dated May 31, 1881.

Original No. 174,454, dated March 7, 1876. Application for reissue filed July 3, 1880.

*To all whom it may concern:*

Be it known that I, CHARLES B. WITHINGTON, of Janesville, in the county of Rock and State of Wisconsin, have invented certain new and useful Improvements in Grain-Binding Mechanism, of which the following is a specification.

My invention more especially relates to automatic binders of the class having a binding or wire-carrying arm moving in a circular path and mounted on a reciprocating carriage; and my said invention consists of certain new combinations and organizations of devices, which are set forth at the close of this specification.

Figure 1:
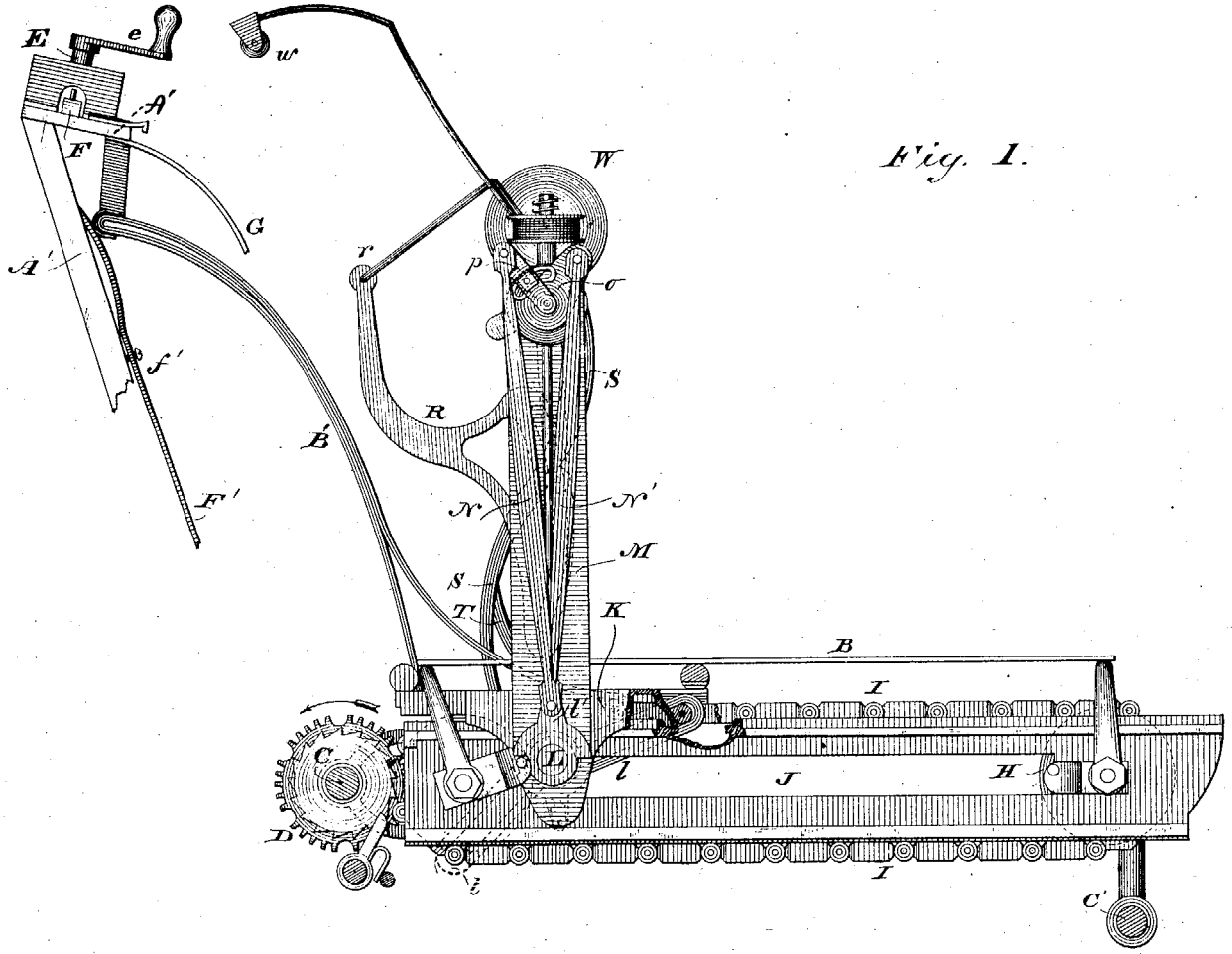
Figure 2:
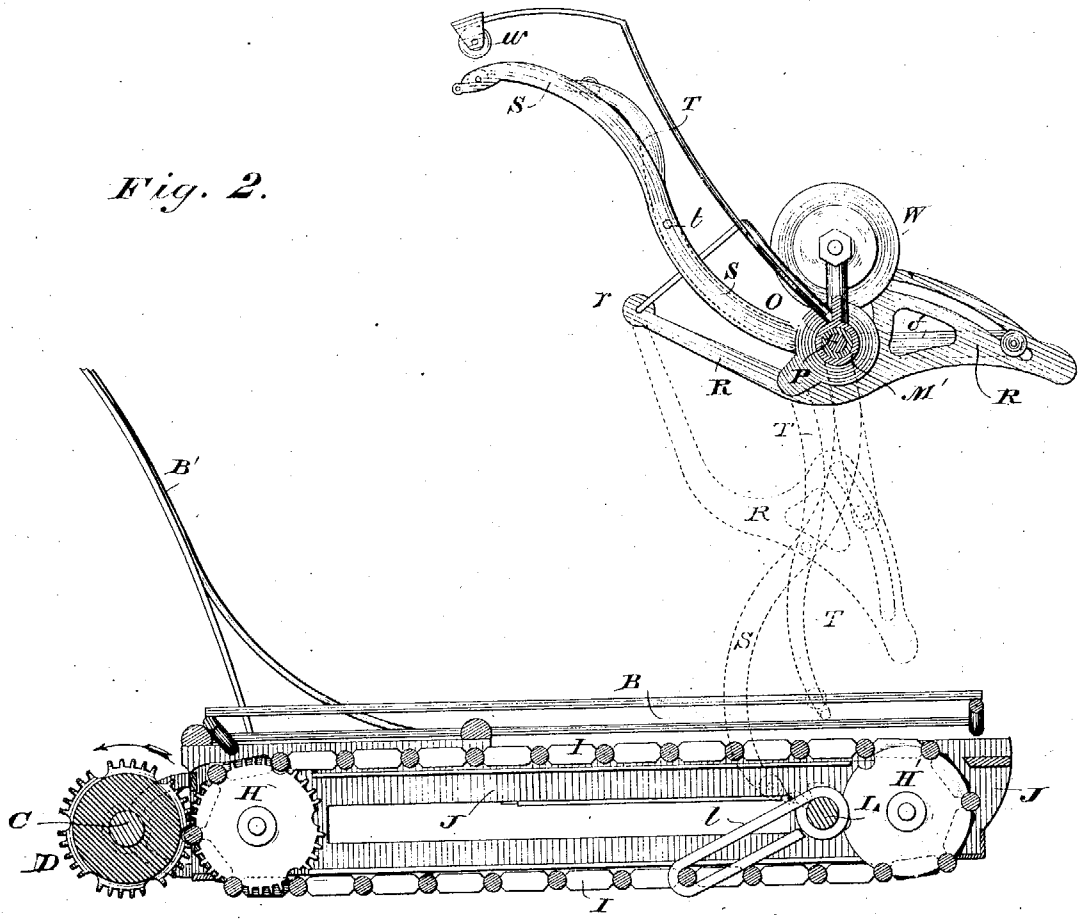
Figure 3:
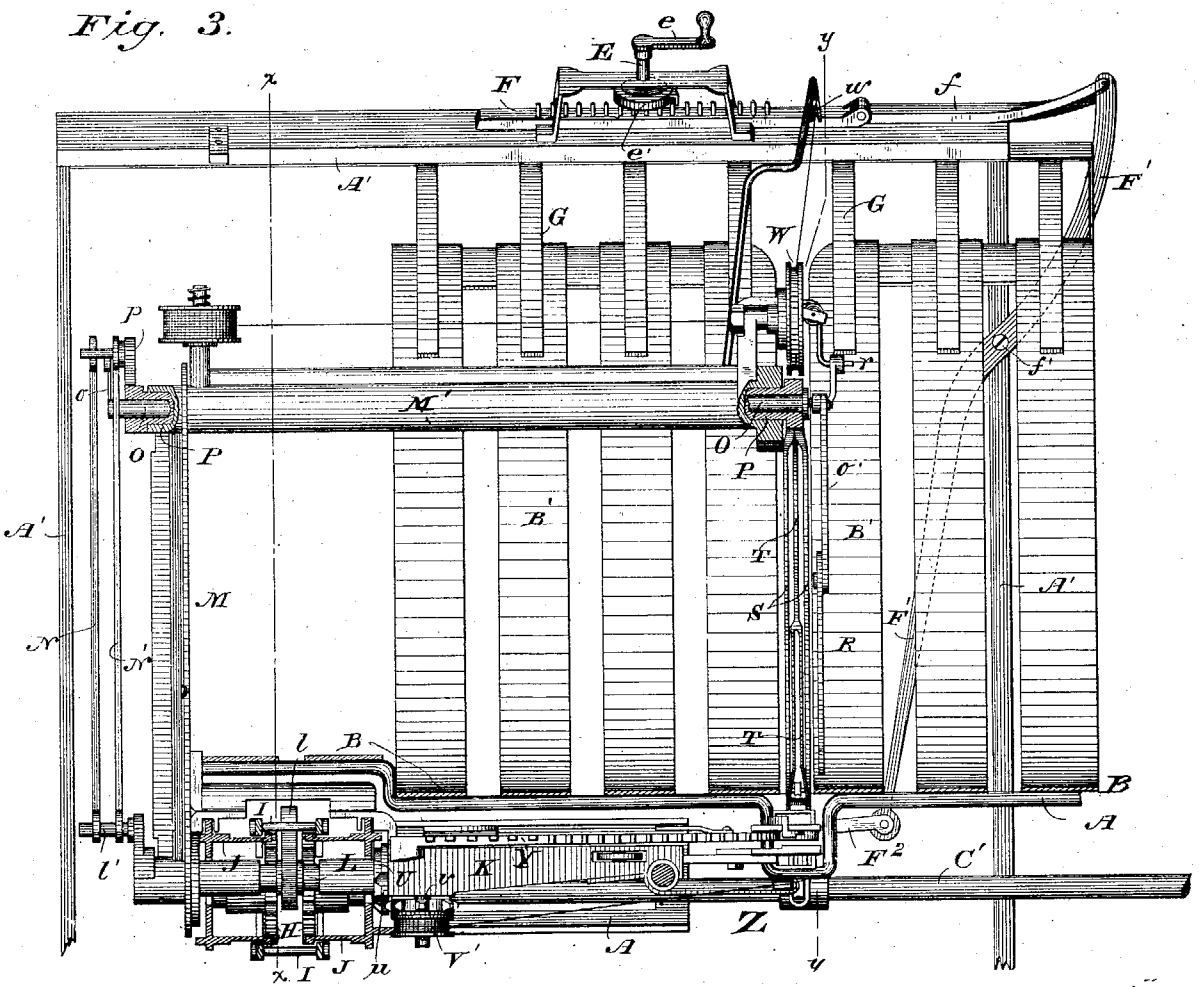
Figure 4:
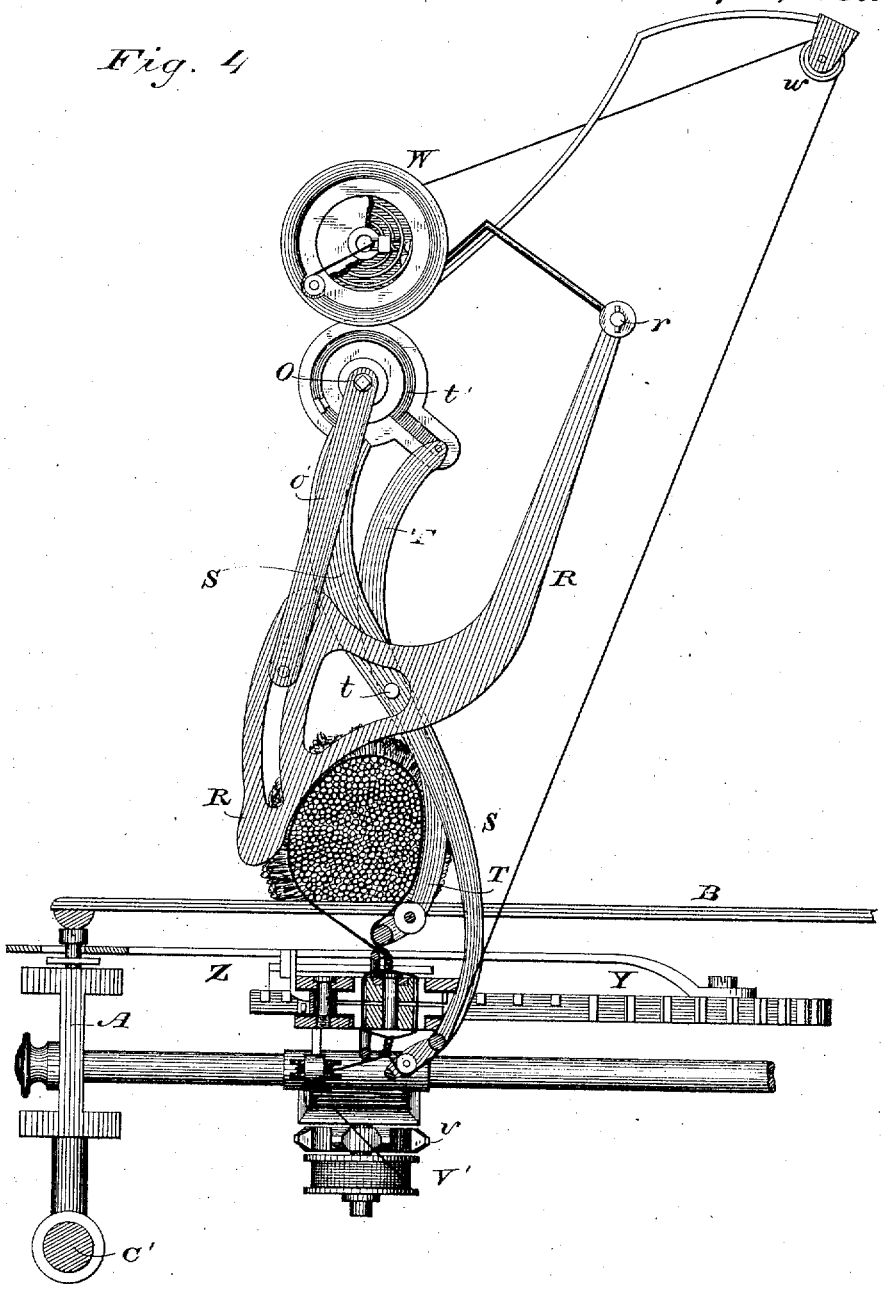
Figure 5:
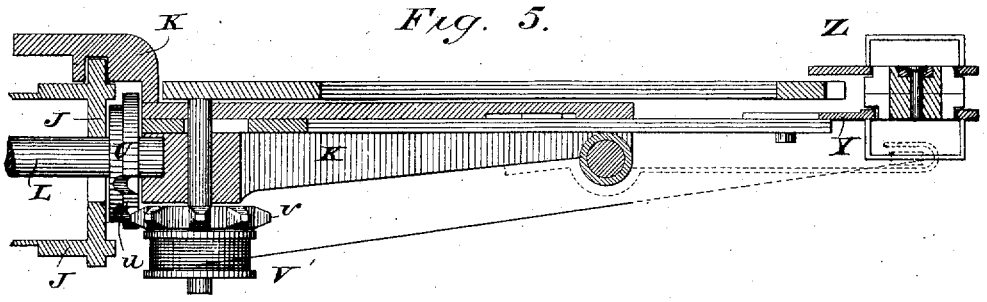
Figure 6:
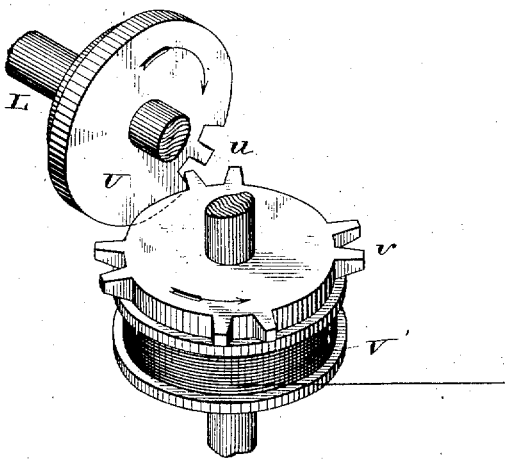
Figure 7:
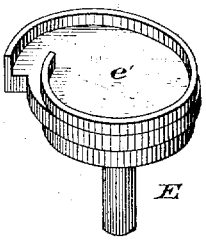
Figure 8:
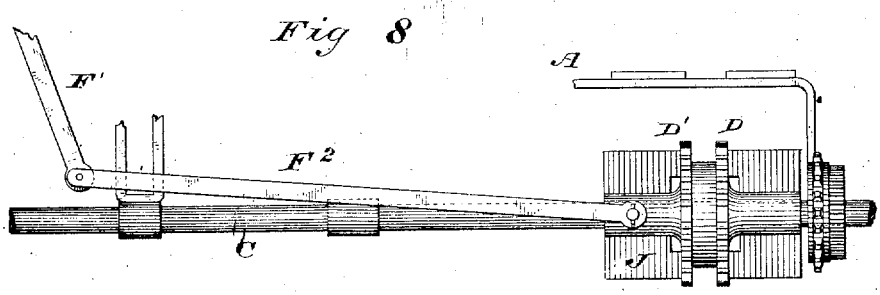

In the accompanying drawings, which show the best way known to me of embodying my improvements previous to the date of my application for the original patent, Figure 1 represents a view, in elevation, of so much of my improved apparatus as is necessary to illustrate the invention herein claimed, as seen from the rear, with the parts in the attitude they assume when the compressing and binding arms are closed upon the bundle. Fig. 2 represents a longitudinal vertical section through the apparatus on the line *x x* of Fig. 3, showing, in full lines, the parts in the attitude they assume at the moment when the bound gavel has been discharged and the binding mechanism is ready to move forward again to seize another bundle. The dotted lines show the relation of the parts when the bundle is compressed. Fig. 3 represents an end elevation of the apparatus, partly in section, with the parts in the position shown in Fig. 1. Fig. 4 represents a view, in elevation, of a portion of the apparatus as seen from the front, partly in section, on the line *y y* of Fig. 3, showing the attitude of the parts at the time the wire is being carried into the twister, after the compression of the bundle. Fig. 5 represents a vertical longitudinal section through the binding mechanism beneath the platform; Fig. 6, a view, in perspective, of the positive stop-motion feed for the lower wire-spool; Fig. 7, a view, in perspective, of the snail-cam or actuating-wheel for adjusting the binder-frame on its ways; and Fig. 8 a view of another portion of said adjusting mechanism, showing the details of its connection with the binding-machine.

The binding mechanism is, by preference, mounted on a suitable frame, A, secured upon the frame of a harvester of any suitable well-known construction, having an endless apron for elevating and delivering the cut grain into a suitable receiver, as in the well-known automatic binders of Watson, Renwick, and Watson, Carpenter, and McCormick.

The grain is delivered from the elevating-apron, through an opening in a gallows-frame, A′, which constitutes a fixed part of the harvester-frame, upon a slatted inclined receptacle, B′, forming an extension of the binding-platform B.

In order that the wire may be passed around the middle of the bundle, notwithstanding variations in the length of the grain, I mount the frame A of the binding mechanism upon ways C C′, which permit it to be moved freely backward and forward in a line parallel with the length of the grain.

The binding mechanism is driven by cranks, sprocket-wheels, or gearing actuated by any suitable prime mover, and mounted on a shaft, C, turning in fixed bearings on the harvester-frame.

In order to accommodate the adjustment of the binding mechanism above mentioned, the shaft C is arranged parallel with the line of adjustment of the binder-frame, and, in fact, in this instance constitutes one of the ways upon which said frame slides, and the double gear D D′, by which the binding mechanism is actuated, is likewise so constructed as to be free to move endwise on the shaft (while compelled to turn with it) by the usual spline or feather. This gear-wheel revolves between jaws of the binder-frame, which keep it in proper relation to the gearing driven by it.

In order to place the adjustment of the binding mechanism under the control of the driver while in his seat on the machine, I mount the shifting mechanism upon the gallows-frame A′, which constitutes, as before stated, a fixed portion of the harvester-frame. This shifting mechanism shown consists of a turning-shaft, E, provided at its upper end with a crank or handle, *e*, to turn it, and at its lower end with a snail-wheel, *e'*. Said wheel *e'* works in or meshes with the teeth of a sliding rack-bar, F, connected with the binding mechanism by means of a jointed connection consisting of a link, *f*, jointed to a lever, F', fulcrumed on the frame-piece A' at *f'*, the lever being, in turn, jointed to a link, F², connected with the sliding binder-frame. By this mode of construction the driver can readily shift the frame to bring the binding-wire to the middle of the length of the bundle by turning the crank or handle *e*, which is constantly maintained in a convenient relation to the driver's seat, the shifting-crank being preferably rendered incapable of movement upon the harvester-frame other than in a horizontal direction, which capacity is given it in order to turn its shaft and the actuating-wheel carried by it to shift the binding mechanism.

By means of the jointed connection between the rack-bar F and the binder-frame I am enabled to employ a rack-bar to shift the binder-frame without danger of cramping or binding the shifting mechanism.

The binding platform or receptacle B, it will be observed, is mounted upon and adjustable with the binder-frame, but is stationary relatively to the line of reciprocation of the binding-arm of the machine, the reciprocation or movement of said binding-arm being in a direction crosswise of that in which the binding mechanism is adjustable to bind the bundle of grain at the proper point.

A grain-deflector, G, mounted on or connected with the receptacle or platform B, slides in guides on the frame-piece A' of the harvester, above the opening in said frame through which the cut grain is delivered, and is thus kept in its proper relation to the other parts, being adjustable with the binding platform or receptacle B and the binding mechanism relatively to the elevating and delivery apparatus of the harvester.

It will be noticed that the shifting mechanism above described is common to the binding mechanism, the deflector, and the binding platform or receptacle, so that all may be shifted or adjusted simultaneously, which construction is preferable, as it preserves the proper working relation of the parts.

The binding mechanism, in most of its details, is similar to that shown in an application for Letters Patent of the United States filed by me March 5, 1874, and patented January 9, 1877, as No. 186,186, and therefore need not here be described in detail.

A double sprocket-wheel, D, mounted upon the driving-shaft C, gears into corresponding wheels H, over which the driving-chain I passes, as well as over corresponding wheels, H', on the opposite end of the slotted box-frame J, described in my patent above mentioned.

The driving-shaft C revolves in the direction indicated by the arrow in Fig. 1, and, by means of a slotted link, *l*, hooked to the driving-chain I and connected with a shaft, L, mounted on a frame or binding-carriage, K, which carries the standard M of the binding-arm, imparts a reciprocating motion to said binding-carriage and said binding-arm.

Pitmen N N', pivoted on the crank *l'* of the shaft L, are respectively attached to the cranks *o p* of two rock-shafts, O P, concentric with each other, and inclosed within the tubular standard or support M' of the binding-arm. (See Fig. 3.) The inner rock-shaft, O, consists of a steel rod, and carries at its forward end a crank-arm, *o'*, working in a slot of a vibrating compressor, R, pivoted at *r* on some projecting portion of the binding-arm frame so as to give the compressor a movement eccentric to that of its driving-shaft O, which shaft, owing to the construction above described, constitutes a torsional spring, allowing the compressing-arm and its driving-crank to yield slightly under any excess of pressure over the normal strain of binding the bundle. I do not claim, however, the adjustable crank and eccentric compressor above described, these devices being the invention of Wm. R. Baker, of Chicago, Illinois.

The binding or wire-carrying arm S is mounted on the rock-shaft P, and, of course, vibrates concentrically with it.

In a machine organized (as mine is) for the use of two wires, or even for the use of a single wire, it is highly advantageous to press the wire into the twister with a positive force applied on each side of it. In order to obtain this desideratum, I have heretofore used a bifurcated arm; but as I find it advantageous to give a piercing action to the point of the binding-arm, while obtaining the advantages above mentioned, I now form a vertical longitudinal slot in the binding-arm, and pivot therein, at *t*, a supplementary arm, T, vibrated at proper intervals by means of a pin on its inner end taking into a cam-groove, *t'*, on the tubular support M' of the binding-arm, as shown in Fig. 4. The organization of these parts is such that as the binding-arm moves forward into the inflowing grain to separate it the point of the supplementary arm is inclosed within the binding-arm, as shown in Fig. 2, so as not to interfere with the piercing action of the latter in separating the grain; but when the arm has passed around the bundle as it is compressed the forward end of the supplementary arm is thrown inward by its cam, as shown in Fig. 4, and the wire is held securely in proper relation to the twister.

The construction and operation of the binding-head and twisting mechanism Z, and its actuating sector-rack Y, being similar to that shown in my application of March 5, 1874, and patent granted thereon, as aforesaid, need no particular description here. I have, however, substituted a positive feed for the wire-supplying device shown in that application. To this end I mount upon the intermittingly-rotating shaft L a stop-wheel, U, having a single tooth,

*u*, which revolves in the direction of the arrow shown in Fig. 6, and gears into a corresponding wheel mounted upon the wire-reel V′, and provided with teeth *v*, arranged in four sets or pairs, thus intermittingly giving off a definite amount of wire, regulated by the size of the drum and the position of the teeth. The slack of the band is taken up by the intermediate take-up tension-drum W of the upper wire, which is shown as passing over a pulley, *w*, on an arm projecting from the binding-arm standard, so as to bring it in proper relation with the binding-head.

The operation of the mechanism, being substantially similar to that shown in my patent above mentioned, need not be particularly described, only so far as to illustrate the peculiarities of the devices herein claimed.

The grain is delivered continuously by the endless apron upon the binding-platform B. In Fig. 2 the parts are shown in full lines in the attitude they assume at the moment of the discharge of the gavel. The binding-arm then moves forward to the position shown in Fig. 1 and pauses while the stirrup-link *l* is turning with the chain around the sprocket H which turns the shaft L, causing its crank *l′* to act through its pitman upon the binding-arms R S, causing them to descend upon and compress the bundle, and carries the wire into the binding-head, as shown in Fig. 4. The arm then moves backward to the position shown in Fig. 2, twisting and severing the wire as it goes, and the binding-arm and compressor retract from the position shown in dotted lines in said figure to that shown in the full lines, leaving the bound bundle upon the platform to be shoved off by the succeeding bundle.

The positive feed of the lower wire takes place during the retracting movement of the binding-arm and while the binding-carriage is stationary.

I disclaim herein, broadly, the combination of the binding-platform, the deflector, and the binding mechanism, all mounted upon a common frame adjustable relatively to the length of the grain. This combination constituted the subject-matter of the first clause of the claim of my original patent; but since the grant of said patent I have discovered that the said combination, broadly considered, is not original with me. I have also discovered, subsequent to the grant of my said original patent, that the validity of its second claim is also a matter of grave doubt, said claim being directed to the combination of the reciprocating binding mechanism, the frame upon which it is mounted, the ways on which the frame traverses, the driving-gearing of the binding mechanism mounted on one of said ways, the shifting-gearing mounted on the main frame, and the link-connections between the shifting-gearing and the traversing binding-frame. The third claim (now fifth) of my original patent is also stated in inaccurate terms. I believe myself, however, to be the first and original inventor of the combinations and organizations recited in the following claims, which are directed to subjects-matter highly useful in grain-binding machinery.

What I claim as my invention is—

1. The combination, substantially as hereinbefore set forth, of a harvester-frame, a binder-frame mounted on said harvester-frame and adjustable thereon relatively to the length of the grain, so as to permit the gavel to be bound at or near its middle, a deflector guided upon the harvester-frame independently of the guides upon which the binder-frame moves, and shifting mechanism for moving said binder-frame and said deflector, while preserving their proper working positions relatively to each other.

2. The combination, substantially as hereinbefore set forth, of the harvester-frame having a gallows-frame through which the cut grain is delivered to be bound, a deflector sliding upon said gallows-frame above the space in said frame, through which the grain is delivered, a binder-frame sliding upon the harvester-frame below the deflector, and a shifting mechanism to adjust said deflector and binder-frame so as to enable the grain to be bound at or near its center, while preserving the proper relations of said deflector and binder-frame to each other.

3. The combination, substantially as hereinbefore set forth, of the harvester-frame, binding mechanism adjustable upon said frame relatively to the length of the grain, so as to permit the gavel to be bound at or near its middle, the sliding rack-bar connected by the jointed connection with the binding mechanism so as to move said mechanism without danger of binding or cramping, and the crank or handle under the control of the driver to move said rack-bar.

4. The combination, substantially as hereinbefore set forth, of the harvester-frame, the binding mechanism adjustable thereon relatively to the length of the grain, so as to permit the gavel to be bound at or near its middle, the horizontally-sliding rack-bar and connections to move said binding mechanism, and the vertical shaft mounted upon the harvester-frame, provided at its lower end with the actuating-wheel meshing with the teeth of said sliding rack-bar to move it, and at its upper end, at or near the top of the harvester-frame, with a crank or handle to turn said shaft, whereby said crank or handle is maintained in a constantly-convenient relation to the driver's seat to move said rack-bar and shift the binder.

5. The combination, substantially as hereinbefore set forth, of the compressor, a torsional spring, and a crank mounted on said spring to actuate said compressor.

6. The combination, substantially as hereinbefore set forth, of the slotted binding-arm, the supplementary arm pivoted centrally therein and vibrating through its slot, and the cam which vibrates said supplementary arm, for the purpose specified.

7. The combination, substantially as herein-before set forth, of a reciprocating binding-carriage, a vibrating binding-arm mounted thereon, a supplementary arm pivoted on said vibrating binding-arm, and a twister mounted on the reciprocating binding-carriage.

8. The combination, substantially as herein-before set forth, of the slotted binding-arm, the supplementary arm pivoted therein, and the vibrating compressor, for the purpose specified.

9. The combination, substantially as herein-before set forth, of a reciprocating binding-carriage, binding mechanism mounted thereon, and a wire-reel, actuated positively during the intermission of the reciprocation of the binding mechanism after binding the bundle.

10. The combination, substantially as herein-before set forth, of the reciprocating binding-carriage, the vibrating binding-arm, the binding-head, the positive feed for one wire, and the intermediate take-up tension-drum for the other wire, whereby the slack of the positive feed is taken up by the tension-drum.

In testimony whereof I have hereunto subscribed my name.

CHAS. B. WITHINGTON.

Witnesses:

B. F. DUNWIDDIE,

JOHN BRENNAN.